May 15, 1951  B. C. DAY  2,553,178
CHUCK FOR INTERNAL GRINDING
Filed Oct. 1, 1947  3 Sheets-Sheet 1
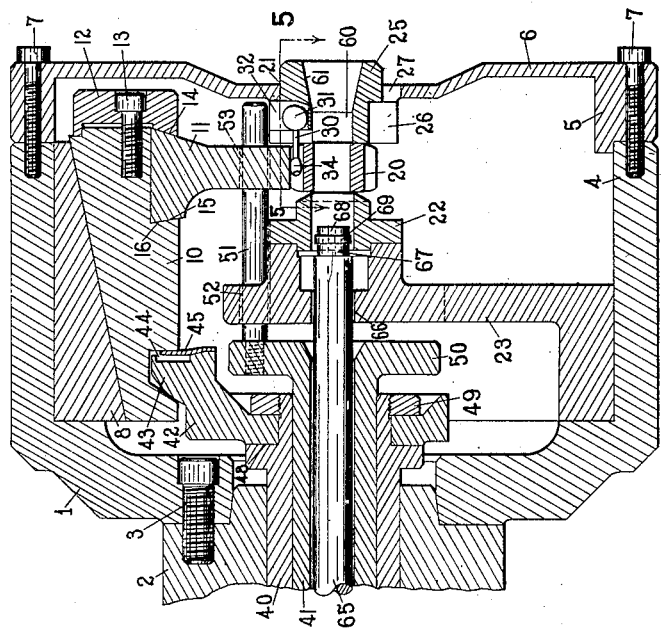
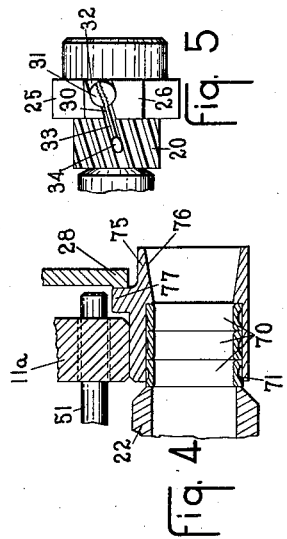
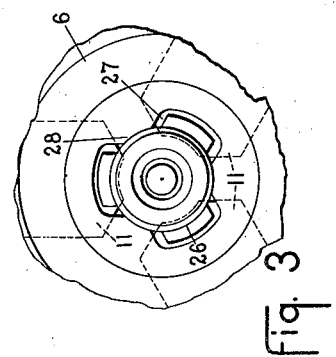
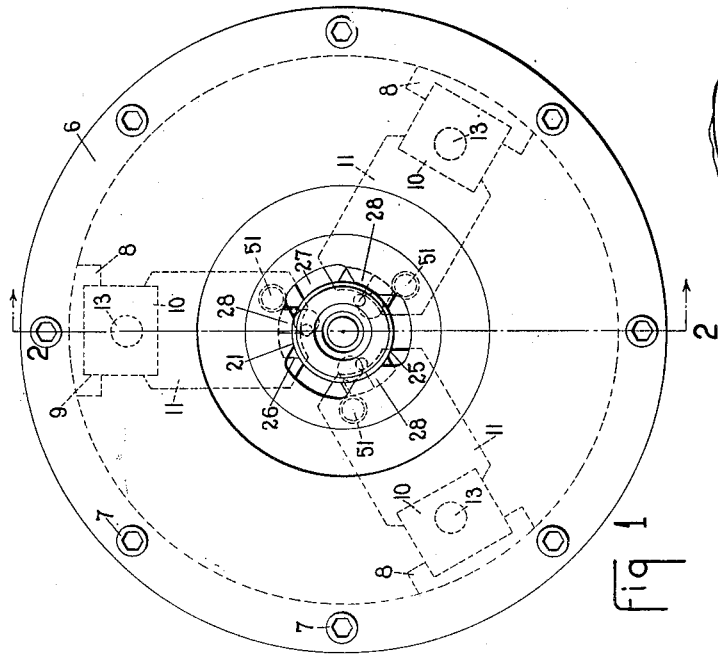
Inventor
Bernard C. Day
by
Wright Brown Quinby May
Att'ys

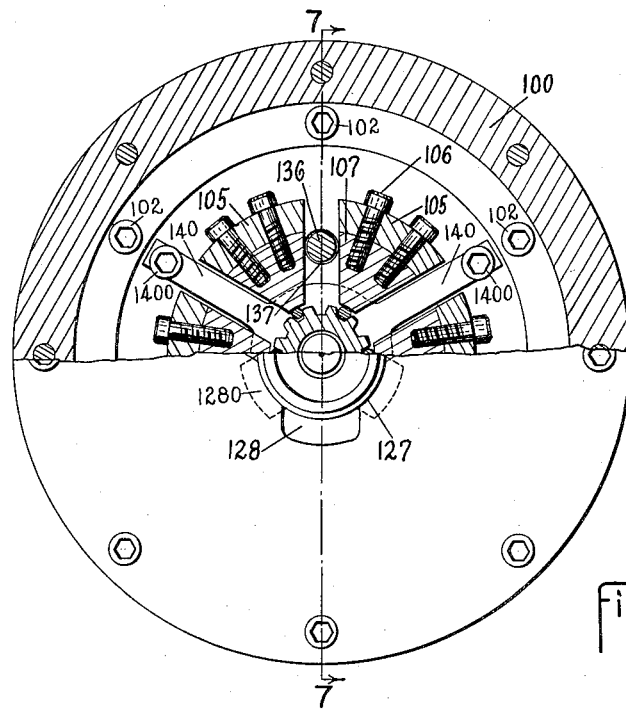
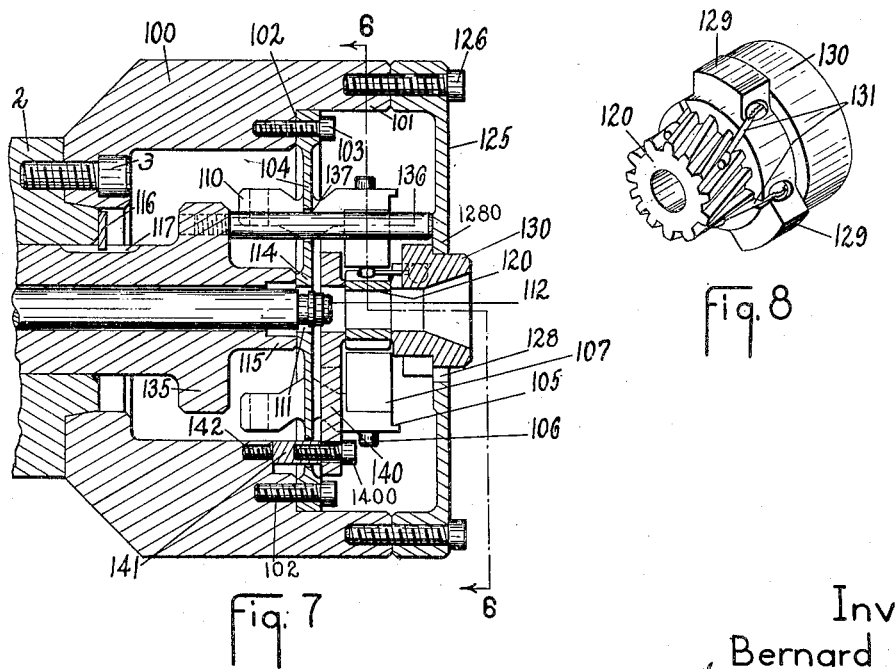

May 15, 1951   B. C. DAY   2,553,178
CHUCK FOR INTERNAL GRINDING
Filed Oct. 1, 1947   3 Sheets-Sheet 3

Inventor
Bernard C. Day
Attys

Patented May 15, 1951

2,553,178

UNITED STATES PATENT OFFICE 2,553,178

CHUCK FOR INTERNAL GRINDING

Bernard C. Day, Springfield, Vt., assignor to Bryant Chucking Grinder Company, Springfield, Vt., a corporation of Vermont Application October 1, 1947, Serial No. 777,237

7 Claims. (Cl. 279—46)

This invention relates to chucks for supporting work pieces, such as gears or inner ball bearing raceways, for internal machining operations such as grinding.

One object of the invention is to provide means engageable with the outer periphery of the work piece for holding it concentric with the chuck, while a diaphragm holds the work piece clamped axially.

A further object is to provide means for first releasing the axial clamping means and thereafter releasing the centering means for removing a work piece, and conversely for first centering the work piece and then clamping it axially preparatory to the machining operation.

For a more complete understanding of this invention, reference may be had to the accompanying drawings in which Figure 1 is a front elevation of a chuck embodying the invention.

Figure 2 is a sectional view on line 2—2 of Figure 1.

Figure 3 is a view similar to a portion of Figure 1, but showing a part in a different position.

Figure 4 is a detail sectional view similar to a portion of Figure 2 but showing a modification.

Figure 5 is a detail sectional view on line 5—5 of Figure 2.

Figure 6 is a front elevation partly broken away and in section of a chuck of different construction but embodying the invention, the section being taken on line 6—6 of Figure 7.

Figure 7 is a sectional view on line 7—7 of Figure 6.

Figure 8 is a perspective view of a clamping member showing a work piece held thereby.

Figure 9:
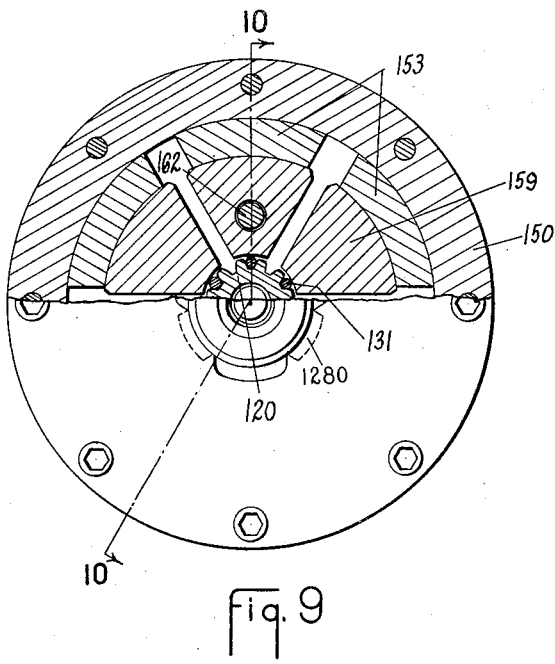
Figure 9 is a view similar to Figure 6, but showing a chuck of another type but also embodying the invention, the section being taken on line 9—9 of Figure 10.

Referring to the drawings, the chuck comprises a cylindrical body 1 adapted to be secured coaxially at its rear end to the nose 2 of a work spindle as by screws 3. This body has a hollow drum-shaped portion or tubular flange 4 against the forward end of which is secured the inwardly turned margin 5 of a diaphragm 6, this diaphragm being secured to the body as by screws 7.

The interior of the body may be provided at angularly spaced points with ways 8, three such ways being shown, these ways being provided with a longitudinal groove 9 within which is slidable a wedge block 10. The outer wall of each groove 9 is inclined lengthwise of the body portion relative to the central axis of the chuck and spindle, so that as the blocks 10 are moved inwardly or toward the spindle, they are forced inwardly toward this axis. Each of the blocks 10 has secured thereto a jaw member 11.

The securing means may comprise a clamping cap 12 secured to the outer end of the block 10 as by one or more screws 13, each clamping block having an inclined face portion 14 engaging a reversely inclined face on the jaw 11 and forcing the jaw inwardly to bring its inclined face 15 against an inclined shoulder 16 on the block 10. This provides for the use of jaws of various sizes and shapes to be removably secured to the block 10, the jaws 11 being chosen in view of the particular work piece which it is desired to operate upon. The inner ends of the jaws 11 which extend toward the axis of the chuck are arranged to engage the outer periphery of a work piece 20. As shown in Figures 1, 2 and 5 such a work piece may comprise a gear. The jaws 11 when positioned forwardly toward the diaphragm 6 form a guide for the slidable reception of the work piece which may be inserted in position through a hole 21 centrally of the diaphragm and against an abutment 22 carried by a supporting bracket 23 seated within the body and between the ways 8. By drawing the blocks 10 rearwardly, however, the jaws 11 are brought toward each other into firm clamping engagement with the outer periphery of the work piece, holding it centered with relation to the chuck body. Outwardly of the work piece is positioned a clamping block 25, this block being substantially cylindrical, but provided with radial projections 26. These radial projections 26 may be passed through correspondingly shaped recesses 27, communicating with a central opening 21 of the diaphragm, and after the projections 26 have been so inserted, the block 25 may be rotated through an angular extent sufficient to bring the projections 26 out of registry with the recesses 27 so that their forward faces may be engaged by marginal portions 28 of the diaphragm opening 21, the diaphragm normally engaging these projections and pressing the block 25 rearwardly against the work piece 20 and the work piece against the abutment 22, and the block may be centered by having its forward outside hub diameter engaged by the inner ends of the portions 28.

When the work piece 20 is a gear, as shown, means may be provided for centering the work piece. Such means, as shown, comprise fingers 30 shown best in Figures 2 and 5, each finger comprising a spherical end member 31 seated in a circular bore 32 in one of the projections 26 and having a shank portion 33 provided with an enlarged rounded end 34 adapted to engage between adjacent teeth of the work piece. These ends 34 are engaged by the clamping jaws 11.

Means are provided by which the jaws 11 and the diaphragm may be actuated successively when it is desired to insert or remove the work piece. For this purpose the work spindle is provided with a central bore through which are slidably mounted a pair of nested sleeves 40 and 41. The outer of these sleeves 40 has secured to its outer end portion a yoke 42 having end portions 43 engageable in slots 44 in the inner faces of the blocks 10 adjacent to their inner ends. Each of the portions 43 may be provided with a spring face member 45 which bears against the forward wall of the slot 44 and resiliently presses the block 10 forwardly to bring the rear inclined face of the slot 44 against the rear face of the portion 43, thus to take up lost motion between the parts. The spider 42 is clamped against an annular shoulder 48 on the sleeve 40 by a nut 49 threaded on its inner extremity and bearing against the forward face of the spider. By producing axial motion of the sleeve 40, the blocks 10 are moved in unison axially, thus to clamp or release the jaws 11 with relation to the work piece.

The sleeve 41 is provided with an outwardly extending flange 50 to which are secured the rear ends of a plurality of pins 51 which are slidable through openings 52 in the bracket 23 and through openings 53 through the jaws 11. The forward ends of these pins 51 terminate just back of the diaphragm 6 closely adjacent to its central opening 27. By moving the sleeve 41 forwardly, these pins 51 may impinge upon the diaphragm and deflect its central portion forwardly so as to release the block 25 from axial clamping and when so released, the block 25 may be turned to bring its projections 26 into alinement with the recesses 27 of the diaphragm, as shown in Figure 3, permitting removal of the block 25 so that when the jaws 11 are thereafter released from radial clamping engagement with the work piece, the work piece may be removed and replaced by another.

The block 25 is shown as provided with a central bore 60 having an outwardly flaring outer end 61 through which a suitable tool such as a grinding wheel (not shown) may be passed and into the bore of the work piece 20 in order to operate upon this central bore. The sleeve 41 may have extended therethrough a rod 65 which may also extend through a central opening 66 through the bracket 23 and have attached to its forward end a work gage 67 provided with gaging shoulders 68 and 69 thereon, the gaging shoulder 68 corresponding to the internal diameter of rough ground work and the larger diameter portion 69 being suitable for finish grinding size. This gage rod 65 may be actuated at desired times to test the grinding operation in the well known manner.

In Figure 4 a modification is shown in which a different form of clamping block is illustrated, particularly suitable for use in connection with grinding of ball bearing raceways. Such raceways are shown at 70, these being the internal raceways, and a plurality of them may be assembled simultaneously within the bore 71 of the clamping block 75. Preferably the several raceways extend throughout a distance slightly greater than the length of the bore 71 so that one of these raceways can be pressed against the abutment 22.

The block 75 is provided with a centrally forwardly flaring bore 76 of somewhat greater internal diameter than the desired internal diameter of the raceways so as to permit a grinding wheel to be passed therethrough and into contact with the inner faces of these raceways. This block 75 is also provided with radial extensions 77 adapted to be passed freely through the recesses 27 in the diaphragm 6, as shown in Figure 3, and then turned to be positioned back of the portions 28 of the diaphragm which can then be allowed to impinge against the forward faces of these extensions to clamp the work pieces rearwardly against the abutment 22. The outer face of the block 75 back of the extensions 77 may be engaged by clamping jaws 11a which are substituted for the jaws 11 shown in Figures 1 and 2. The operation is similar to that previously described, the work piece being centered and so clamped by the jaws while the diaphragm acts to hold the work piece rearwardly, clamping them axially against the abutment 22 for the grinding operation.

In Figures 6 to 10 chucks having other means for centering the work piece have been illustrated. Referring first to Figures 6 to 8, the chuck body 100 which may be secured in coaxial relation to the rotary work spindle 2 by the screws 3, is provided with a counterbored portion 101 adjacent to its outer end which forms at its rear end, an annular shoulder 102. Against this annular shoulder 102 is fixed, as by screws 103, a diaphragm 104. This diaphragm has projecting from its forward face a plurality of fingers 105 to the outer ends of which may be secured, as by screws 106, clamping blocks 107. As shown in Figure 6, six of these fingers may be employed, although there might be more or less as desired, and, if desired, also, the centrifugal force due to rotation of the chuck which might tend to flex the chuck and release the work, may be counterbalanced by a series of somewhat similar fingers 110 projecting from the rear face of the diaphragm 104. This construction is not claimed herein as it is not my invention, but forms subject matter of an application for Letters Patent Serial No. 735,052 for Diaphragm Chuck filed March 17, 1947, by Merton H. Arms, now Patent Number 2,538,289, issued January 16, 1951. The diaphragm may have a central opening 111 therethrough through which a plug gage 112 may be projected into the work, and just outwardly of this hole 111 the diaphragm may be provided with a thickened hub portion 114 which may be engaged by the forward end of a sleeve 115 axially slidable through the spindle 2, as shown, keyed against rotation relative thereto by a key element 116 riding in a keyway 117 in the sleeve 115. By pushing outwardly on the sleeve 115 the diaphragm 104 may be flexed outwardly in a direction to separate the clamping blocks 107, thus to permit the insertion or removal of a work piece therebetween, it being understood that when the diaphragm 104 is free, the clamping blocks 107 tend to be positioned sufficiently inwardly to clamp the work piece, shown as a gear 120, therebetween.

To the outer end of the body 100 there is secured the outer margin of a second diaphragm 125, this diaphragm 125 being secured in position as by the screws 126. This diaphragm 125 has a central opening 127 provided with angularly spaced extensions 128 through which may be passed extensions 129 of the work clamping member 130. Parts 1280 between the extensions 128 engage and radially center the work clamping member. This member 130 may be substantially the same as the member 25 shown in Figures 1, 2 and 3, and it may be provided with rearwardly extending fingers 131 mounted similar to the fingers 39 of Figures 2 and 5, which have enlarged inner ends engaging between the teeth of the gear 120 which constitutes the work piece, the internal surface of which is to be left free for a grinding operation. The diaphragm 125 serves to hold the work piece back against a stop plate 140 secured by screws 1400 to three posts 141 each threaded at its rear end at 142 into the body 100. The plunger 115 has an extended flange 135 to which is attached the rear end of a push rod 136 which extends through a hole 137 through the diaphragm 104 and the forward end of which impinges upon the diaphragm 125 well inwardly from its outer margin. Forward motion of the plunger 135 thus acts to deflect the diaphragm 125 away from engagement with the forward faces of the projections 129 of the work holding member, thus freeing this member for angular rotation sufficient to permit the extensions 129 to be turned and passed through the extensions 128 of the diaphragm opening, and this same motion of the plunger 135 also acts to flex the diaphragm 104, thus to relieve the radial pressure normally exerted by the blocks 107 against the work piece so that the work piece is freed to be removed, together with the member 130, and a new work piece substituted therefor.

Figure 10:
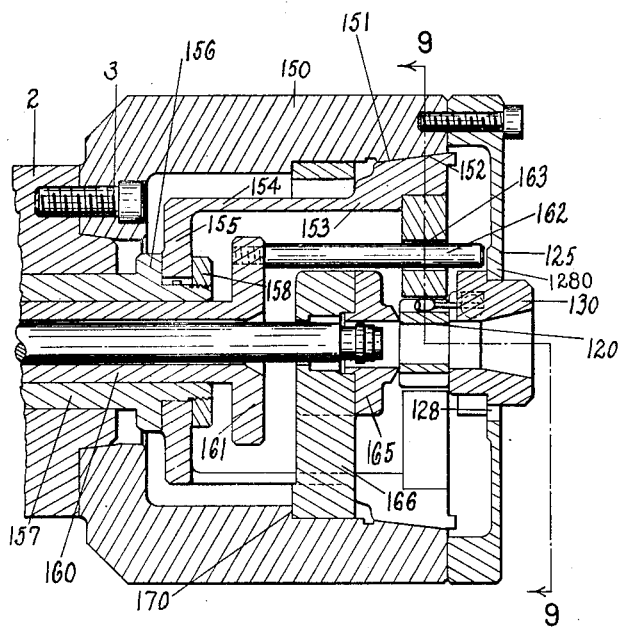
Figure 10 is a sectional view on line 10—10 of Figure 9.

In Figures 9 and 10, still another type of chuck has been illustrated. This chuck comprises a body 150 adapted to be secured coaxially as by the screws 3 to the rotary spindle 2. The outer end portion of the body 150 is provided with an internal tapered bore 151 with which cooperates the reversely tapered external surfaces 152 of spring collet jaws 153 of a collet member 154. These jaws 153 (six being shown, though more or less might be employed), may be provided with clamping blocks 159 on their inner faces for engagement with the work piece or with the fingers 131 of the work piece carrier 130, similar to the blocks 107 of the construction shown in Figures 6 and 7. The inner end of the collet 153 has a reduced diameter flange portion 155 which is engaged between an outwardly extending flange 156 on the push sleeve 157 and a collar 158 threaded on its outer end. By axial motion of the sleeve 157 it will be evident that the collet jaws 153 may be moved inwardly or allowed to spring outwardly through their engagement with the inner tapered face 151 of the body, thus to clamp or release the work piece.

Inwardly of the sleeve 157 is a second push sleeve 160 having a flange 161 at its outer end carrying the rear ends of push rods 162, each of which, as shown, passes through a hole 163 through one of the blocks 159 and is normally in proximity to the inner face of the diaphragm 125 which may be identical with the outer diaphragm 125 shown in Figures 6 and 7. This diaphragm 125 may be allowed to spring into clamping engagement with the work holding block 130 and may be freed therefrom by forward motion of the sleeve 160. The work piece 120 when in position is held against a stop sleeve 165 carried by a spider having legs 166 suitably secured against an internal annular shoulder 170 on the body 150. By pushing forwardly on the sleeve 157, the radial clamping of the work piece is released, while pushing forwardly on the sleeve 160 causes release of the work from its engagement with the stop 165.

From the foregoing description of certain embodiments of this invention it should be evident to those skilled in the art that various other changes and modifications might be made without departing from its spirit or scope.

I claim:

1. A chuck having a hollow cylindrical body for attachment coaxially to a work spindle, a diaphragm fixed adjacent to its outer margin coaxially to said body, said diaphragm having work-gripping fingers extending outwardly therefrom in circular array for normally holding a work piece therebetween in coaxial relation to said body, a stop carried by said body in position to limit the extent to which a work piece may be inserted between said fingers, means engaging with said diaphragm actuable to deflect said diaphragm in a direction to separate said fingers for the removal or reception of a work piece therebetween, and releasable means for holding a work piece between said fingers back against said stop.

2. A chuck having a hollow cylindrical body for attachment coaxially to a work spindle, said body having ways on its inner face spaced angularly about its axis and inclined toward said axis toward one end of said body, a work clamping jaw slidably carried in each of said ways, means engaging said jaws and movable axially of said body for sliding said jaws simultaneously in said ways to close or open said jaws relative to work placed therebetween, a stop carried by said body limiting the extent to which a work piece may be inserted in said body between said jaws, means for clamping the work endwise against said stop, and means for actuating said axially movable means and said clamping means.

3. A chuck having a hollow cylindrical body, a stop in said body limiting the extent to which a work piece may be inserted into said body, means for guiding a work piece against said stop coaxially with said body, a clamp block engageable with the forward end of the work piece, a diaphragm secured at its margin to said body and having a central hole through which said block may project and normally engaging an end face of said block to press said block rearwardly against the work piece and the work piece against said stop, and means engageable with said diaphragm inwardly of its margin and movable to deflect the central portion of said diaphragm out of clamping engagement with said block.

4. A chuck having a hollow cylindrical body, a stop in said body limiting the extent to which a work piece may be inserted into said body, means for guiding a work piece against said stop coaxially with said body, a clamp block engageable with the forward end of the work piece, a diaphragm secured at its margin to said body and having a central hole through which said block may project, said block having spaced radial extensions with which marginal portions of said diaphragm adjacent to said hole may engage to press said block rearwardly against the work piece and the work piece against said stop, said diaphragm having angularly spaced recesses communicating with said hole and through which said extensions may be passed to insert or remove said block from operative position on relative rotation of said block and diaphragm to registering positions for said extensions and recesses, said block being tubular to permit a tool to be passed therethrough and into operative engagement with the interior wall of the work piece, and means actuable to deflect the central portion of said diaphragm out of work-clamping position.

5. A chuck having a hollow cylindrical body, a stop in said body limiting the extent to which a work piece may be inserted into said body, means for guiding a work piece against said stop coaxially with said body, a clamp block engageable with the forward end of the work piece, a diaphragm secured at its margin to said body and having a central hole through which said block may project, said block having spaced radial extensions with which marginal portions of said diaphragm adjacent to said hole may engage to press said block rearwardly against the work piece and the work piece against said stop, said diaphragm having angularly spaced recesses communicating with said hole and through which said extensions may be passed to insert or remove said block from operative position on relative rotation of said block and diaphragm to registering positions for said extensions and recesses, said block being tubular to permit a tool to be passed therethrough and into operative engagement with the interior wall of the work piece, and means actuable to deflect the central portion of said diaphragm out of work-clamping position, and having means for centering the work-piece relative thereto.

6. A chuck having a hollow cylindrical body, a stop in said body limiting the extent to which a work piece may be inserted into said body, means for guiding a work piece against said stop coaxially with said body, a clamp block engageable with the forward end of the work piece, a diaphragm secured at its margin to said body and having a central hole through which said block may project, said block having spaced radial extensions with which marginal portions of said diaphragm adjacent to said hole may engage to press said block rearwardly against the work piece and the work piece against said stop, said diaphragm having angularly spaced recesses communicating with said hole and through which said extensions may be passed to insert or remove said block from operative position on relative rotation of said block and diaphragm to registering positions for said extensions and recesses, said block being tubular to permit a tool to be passed therethrough and into operative engagement with the interior wall of the work piece, means actuable to deflect the central portion of said diaphragm out of work-clamping position, the work piece being externally toothed, and said block having fingers extending therefrom and engaging between the teeth of the work piece adjacent to the pitch level, and means engageable with said fingers to center the work piece relative to said body.

7. A chuck having a hollow cylindrical body provided with ways on its inner face spaced angularly about its axis and inclined toward said axis toward one end of said body, a slide carried by each of said ways, and having a slot in its inner face, a spider mounted for motion axially of said body and having portions engaging in each of said slots, each of said portions having a spring face member engaging a wall of said slot and pressing the opposite face of said portion against the opposite wall of said slot, a work-engaging element carried by each slide, and means for moving said spider axially to move said slides and thus move said work-engaging elements.

BERNARD C. DAY.

REFERENCES CITED

The following references are of record in the file of this patent:

UNITED STATES PATENTS

| Number | Name | Date |
|---|---|---|
| 1,812,455 | Stowell | June 30, 1931 |
| 1,858,693 | Norman | May 17, 1932 |
| 2,389,366 | Jones | Nov. 20, 1945 |
| 2,403,599 | Hohwart et al. | July 9, 1946 |